July 17, 1962 C. G. SONTHEIMER 3,045,069

REMOTE CONTROL SYSTEM

Filed May 9, 1957

INVENTOR:
CARL G. SONTHEIMER
BY
Curtis, Morris & Safford
ATTORNEYS.

United States Patent Office 3,045,069
Patented July 17, 1962

3,045,069
REMOTE CONTROL SYSTEM

Carl G. Sontheimer, South Norwalk, Conn., assignor to Dictaphone Corporation, Bridgeport, Conn., a corporation of New York Filed May 9, 1957, Ser. No. 658,078
4 Claims. (Cl. 179—6)

Figure 1:
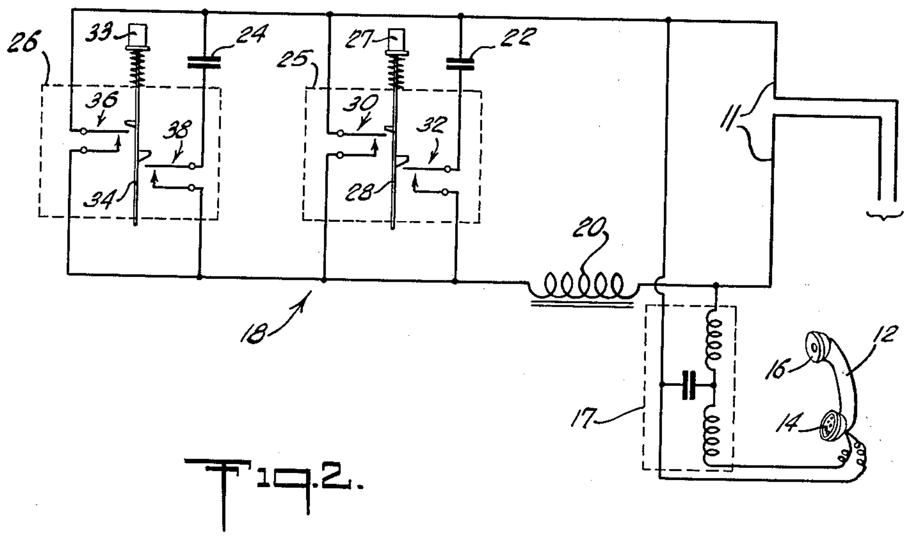

This invention relates to a system for remotely controlling the operation of a dictating machine and the like.

A particular object of the invention is to provide a remote control arrangement which can be used with existing telephone equipment to control from a telephone handset the operations, such as start and stop, of a remotely located dictating machine.

Another object is to provide such a system which is simple and inexpensive but yet provides completely reliable and highly convenient operation.

A further object is to provide a system of this kind which can be attached to an ordinary two-wire telephone line and operate without an auxiliary source of power and without interfering with normal functioning of the regular telephone equipment.

These and other objects will in part be pointed out and in part understood from the description given hereinafter.

In remotely controlled dictating machine systems, various arrangements for controlling the functions of a dictating machine, such as start, stop, correction, and review, have previously been developed. One currently used arrangement achieves this control by means of the dial mechanism of a telephone handset, the number 7 for example being dialed to signal the dictating machine for a review of previous dictation, the number 1 for starting the machine, and so on. To make this arrangement work well however, requires fairly complicated apparatus. Moreover, and perhaps more importantly, the mere dialing of a number repeatedly, for example, to start and stop the dictating machine with the frequency common during normal dictation, soon becomes a burden on the person dictating and an irritating inconvenience.

Another remote control system, which avoids these difficulties does so by using a number of separate wires, in addition to the two wire telephone line which carries the audio signals to the dictating machine. In this way it is easily possible to obtain what is termed "push to talk" operation, that is, push button control of the start and stop operation of the dictating machine, which from experience has been found to be the most convenient mode of control. However, the cost of installing the additional wires required in this system is a big disadvantage and limits its use to places where these wires can be installed.

The present invention is intended to provide a remote control dictating system having the advantages of the prior two-wire and the multi-wire systems described above but without their shortcomings or disadvantages.

In accordance with the present invention a very efficient electric tone generator is provided at the transmitting end of a two-wire line remote control system. The generator is arranged to send one or more different audio tones over the line to control a receiver such as a dictating machine at the far end. The receiver is equipped with one or more relays, each responsive to a particular tone, these relays being connected to control the various operations of the receiver. The tone generator herein used can be connected to an ordinary telephone installation without adversely affecting its operation.

The generator draws what little power it requires from the telephone line itself, but even so the generator does not interfere with normal telephone dialing or speaking. In spite of the simplicity of the tone generator, it is exceedingly reliable in operation and the system cannot be made to mis-function by any normal mishap such as a sudden burst of noise caused by dropping the telephone transmitter. This tone generator, because it does not function by sending out a direct-current pulse, can be used satisfactorily to send a control signal to a receiver over a line running through a city telephone exchange, thus making possible the use of the generator with practically any telephone. Because the generator can be made very compact in size, it can easily and unobtrusively be attached to an ordinary telephone handset to convert it into a complete control unit for a remote dictating machine.

Figure 2:
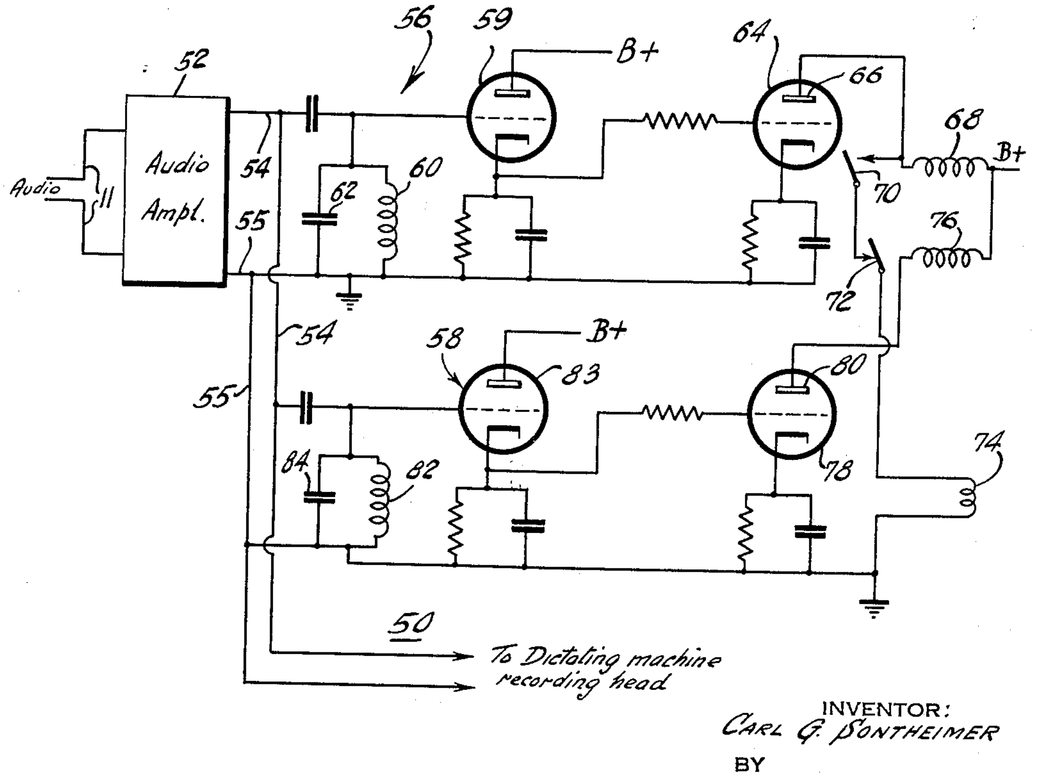

A better understanding of the invention together with a fuller appreciation of its many advantages will best be gained from a study of the following description given in connection with the accompanying drawings in which:

FIGURE 1 is a schematic circuit of a transmitter in a remote control two wire system embodying features of the invention; and FIGURE 2 is a schematic circuit for a receiver accompanying the transmitter of FIGURE 1 and responsive to control signals from it.

With reference to FIGURE 1, there is shown connected to an ordinary two-wire telephone line 11 a handset 12 comprising a speaker 14 and an earphone 16. An audio filter 17 is connected in series with the handset and the line. Connected to the line in parallel with the handset is a tone generator generally indicated at 18. This includes an inductor 20 having a high Q, for example 25 or more, and the two separate capacitors 22 and 24 which are adapted to be connected alternatively in series with the inductor to complete a series resonant circuit.

Each capacitor 22 and 24 has associated with it a respective one of the double-pole push button switches 25 and 26. Switch 25 has a button 27 which can be depressed by a person's finger to actuate a mechanical plunger 28 thereby first closing and then releasing the two sets of contacts 30 and 32. Switch 26 has a similar push button 33 and a mechanical plunger 34 adapted to move downward and first close then release in unison the contacts 36 and 38.

The contacts 30 and 32 of switch 25 are operated together so that they close in unison. When closed, contact 30 short circuits the series connection of capacitor 22 and contact 32, and connects inductor 20 directly to the telephone line. This permits a direct-current to flow in the inductor in accordance with the direct voltage normally maintained on the line. Contact 32 is not released and is therefore held closed for a short instant, for example 0.1 sec., after plunger 28 of switch 25 is pressed far enough down to open contact 30, contact 30 being designed to open very quickly. During this brief instant when contact 32 stays closed, the current that was flowing in inductor 20 from line 11 through contact 30, is forced now to flow through contact 32 and capacitor 22. Thereupon, oscillations at the resonant frequency or tone determined by inductor 20 and capacitor 22 are initiated and these are transmitted by line 11 to a receiver at the far end. The tone generated by the ringing of inductor 20 and capacitor 22 lasts until it is damped out by the losses in the circuit, but since inductor 20 has a high Q, and for a telephone line impedance of 600 ohms resistive, the tone can be made to last 0.015 sec. for example, which is easily long enough to actuate a sensitive relay in the receiver.

Switch 26 is actuated alternatively to switch 25 to generate a different tone. To this end capacitor 24 is made either larger or smaller than capacitor 22. The opening of contact 38 of switch 26 is similarly delayed after the opening of contact 36 to permit the generation of oscillations between inductor 20 and capacitor 24. Contact 36 is a quick break type like contact 30 of switch 25. The audio filter 17 connected in series with handset 12 effectively prevents control tones from reaching it though the filter does not interfere with speech signals to and from the handset.

Connected to the receiving end of line 11, as shown in FIGURE 2 is a receiver 50 having an input amplifier 52 whose output is connected to the two wires 54, 55. These wires are connected to a tone detecting and recognizing circuit, now to be described, and to the recording head of a dictating machine, not shown, but which can be of conventional kind.

Wires 54 and 55 are also connected to the two tuned amplifiers 56 and 58 each of which is responsive to one and only one tone sent over the line from its transmitting end. Tuned amplifier 56 includes an input tube 59 having connected to its grid a parallel resonant circuit comprising the inductor 60 and the capacitor 62. The resonant frequency of this inductor and capacitor is set to coincide with the frequency of one of the control tones sent over the line, for example, the tone sent by inductor 20 in conjunction with capacitor 22. When such a tone is received, a substantial voltage is generated across inductor 60 and capacitor 62 and this through the cathode circuit of tube 59 drives the output tube 64 of amplifier 56 to full conduction, the increased current flowing to the plate 66 of this tube energizing the relay coil 68 which in turn closes the switch 70. Connected in series with this switch and ground are a second switch 72 and the energizing coil 74 of a relay, not shown, which controls the stop and start, for example, of a dictating machine. The series circuit of switches 70 and 72 and coil 74 is connected through relay coil 68 to the B+ supply which also energizes amplifiers 56 and 58 including output tube 64. Thus when switch 70 is closed, with switch 72 already closed as shown, current flows through coil 68 in switch 70 to ground thus holding switch 70 closed even though thereafter tube 64 ceases to conduct. The current flowing through switch 70 not only serves to keep it closed but also energizes the control coil 74 to start, for example, the dictating machine.

Switch 70 will be held closed until switch 72 is pulled open by its associated armature coil 76 when a signal current begins to flow through it. Such a current is generated when the output tube 78 of amplifier 58 is driven to full conduction, the plate 80 of this tube being connected in series with coil 76 and B+.

Connected to the input of amplifier 58 is a second parallel tuned circuit comprising the inductor 82 and the capacitor 84 whose resonant frequency is the same as the frequency of the tone sent over the line by inductor 20 in conjunction with capacitor 24 for example. When such a tone appears, it causes a voltage on wires 54 and 55 which results in a substantial voltage across inductor 82 and capacitor 84 but practically no voltage across inductor 60 and capacitor 62 which are tuned to a substantially different frequency. The tone voltage across inductor 82 and 84 in turn drives tube 78, through the cathode follower tube 85, to full conduction thereby momentarily opening switch 72. This in turn releases switch 70, de-energizes control coil 74, and stops the dictating machine. When tube 78 ceases to conduct at the end of a tone which energizes it, switches 70 and 72 will occupy the position shown in FIGURE 2, each switch being spring biased to this position.

In a circuit substantially the same as that shown in FIGURES 1 and 2 which has been built and successfully tested, inductor 20 and capacitor 22 were set to resonate at 3000 cycles per second, and inductor 20 with capacitor 24, at 5000 c.p.s. Capacitor 22 was made approximately 200 micromicrofarads; and capacitor 24 approximately 600 micromicrofarads. Sudden noises, such as loud whistles, occurring at the telephone handset of the transmitter failed to cause false operation. Inductor 20 had an inductance of 520 millihenrys with a Q of 28. It had a relatively low resistance and so the fairly low direct voltage on the usual telephone line could cause a relatively large current through the inductor, thus storing a sizeable amount of energy in it in the form of magnetic flux. This energy, in the embodiment illustrated, is applied to a series resonant circuit which has a very low impedance at resonance and which is not too heavily damped by the low impedance of the telephone line, 600 ohms for instance.

The above description of the invention is intended in illustration and not in limitation thereof. Various changes may occur to those skilled in the art and these may be made without departing from the spirit or scope of the invention as set forth.

I claim:

1. In a remote control dictation system of the character described, a tone generator which is adapted to be momentarily connected to one end of a telephone line and to be energized by the direct voltage normally maintained on said line, said generator comprising an inductive winding, a capacitor resonant with at least a portion of said winding, switch means adapted momentarily to connect said winding to said line and to establish therein a large magnetic flux, and a control mechanism connected to the other end of said line and adapted to control at least one function of a dictating machine and the line in accordance with the tone sent by said generator.

2. The combination of elements as in claim 1 wherein said switch first connects said winding directly across said line to establish a magnetic flux in the winding, and thereafter for a short interval only connects said winding in series with said capacitor across said line.

3. The combination of elements as in claim 2 in further combination with a second capacitor adapted to be connected in series alternatively with the first capacitor.

4. A remote control system suitable for operation over a single telephone line, said system including a two-conductor line having a direct voltage normally maintained thereon and suitable for the transmission of audio signals, a machine to be controlled and which is connected to the remote end of said line said machine having a control mechanism responsive to at least one discrete signal frequency sent over said line, and a signaling generator at the sending end of said line, said generator including an inductor and a capacitor resonant at said signal frequency, and energizing means to set said inductor and capacitor into oscillation using power derived solely from said line, said energizing means including a switch operated to first connect said inductor by itself across said line and then quickly to connect said inductor and capacitor in series across said line.

References Cited in the file of this patent

UNITED STATES PATENTS

| | | |
|---|---|---|
| 2,427,850 | Gehman | Sept. 23, 1941 |
| 2,709,202 | Handschin | May 24, 1955 |
| 2,732,432 | Hullegard | Jan. 24, 1956 |
| 2,784,254 | Lane | Mar. 5, 1957 |
| 2,909,609 | Svala | Oct. 20, 1959 |

UNITED STATES PATENT OFFICE

CERTIFICATE OF CORRECTION

July 17, 1962

Patent No. 3,045,069

Carl G. Sontheimer

It is hereby certified that error appears in the above numbered patent requiring correction and that the said Letters Patent should read as corrected below.

Column 4, line 33, for "line" read -- like --.

Signed and sealed this 30th day of October 1962.

(SEAL)
Attest:

ERNEST W. SWIDER
Attesting Officer

DAVID L. LADD
Commissioner of Patents